(12) United States Patent
Shiell et al.

(10) Patent No.: US 10,958,713 B2
(45) Date of Patent: Mar. 23, 2021

(54) FUNCTION MANAGER FOR AN EDGE COMPUTE NETWORK

(71) Applicant: Verizon Digital Media Services Inc., Dulles, VA (US)

(72) Inventors: Derek Shiell, Santa Monica, CA (US); William Pressly, Los Angeles, CA (US); Mehrdad Arshad Rad, Playa Del Rey, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 143 days.

(21) Appl. No.: 16/398,459

(22) Filed: Apr. 30, 2019

(65) Prior Publication Data

US 2020/0351327 A1 Nov. 5, 2020

(51) Int. Cl.
*H04L 29/08* (2006.01)
*H04L 12/911* (2013.01)
*H04L 12/26* (2006.01)

(52) U.S. Cl.
CPC .............. *H04L 67/10* (2013.01); *H04L 43/08* (2013.01); *H04L 47/82* (2013.01); *H04L 67/06* (2013.01); *H04L 67/02* (2013.01)

(58) Field of Classification Search
CPC ......... H04L 67/10; H04L 43/08; H04L 47/82; H04L 67/06; H04L 67/02
See application file for complete search history.

(56) References Cited

U.S. PATENT DOCUMENTS

| 10,073,688 | B2 * | 9/2018 | Park | G06F 9/452 |
|---|---|---|---|---|
| 10,129,330 | B2 * | 11/2018 | Cabrera | H04L 67/18 |
| 10,356,204 | B2 * | 7/2019 | Hazen | H04L 63/0876 |
| 10,749,740 | B2 * | 8/2020 | Saxena | H04L 67/10 |
| 2012/0011254 | A1 * | 1/2012 | Jamjoom | G06F 9/4856 709/226 |
| 2012/0303818 | A1 * | 11/2012 | Thibeault | H04L 67/10 709/226 |
| 2013/0007282 | A1 * | 1/2013 | Davis | G06F 9/5083 709/226 |
| 2016/0087910 | A1 * | 3/2016 | Mittal | H04L 67/32 709/226 |
| 2019/0098474 | A1 * | 3/2019 | Zhu | G06F 9/4856 |
| 2020/0169857 | A1 * | 5/2020 | Yang | H04L 67/303 |

* cited by examiner

*Primary Examiner* — Philip J Chea
*Assistant Examiner* — Robert B McAdams
(74) *Attorney, Agent, or Firm* — Ansari Katiraei LLP; Arman Katiraei; Sadiq Ansari

(57) ABSTRACT

An Edge Compute Network ("ECN") may provide compute devices with configurable compute resources at different network edges for selective localized and low latency execution of user-defined operations. A user may provide a set of operations in any of several supported programming languages, and the ECN may create an executable environment that can execute the set of operations using the compute resources of any ECN compute device. A function manager for a compute device may selectively initialize, based on requests to execute the set of operations and an initialization policy, the executable environment so that the set of operations can be directly executed using the compute resources of that compute device upon request. The function manager may also selectively remove initialized executable environments based on compute device resource utilization, executable environment usage, and a removal policy.

20 Claims, 11 Drawing Sheets

FUNCTION MANAGER FOR AN EDGE COMPUTE NETWORK

BACKGROUND

A Content Delivery Network ("CDN") may include Points-of-Presence ("PoPs") that are deployed to different geographic regions and/or network locations. Each PoP may include one or more servers that cache content from one or more remote origin sources, and each PoP, via the caching servers, may redistribute the cached content to users that operate from geographic regions near the PoP with less latency than if the same content was requested and/or served from the remote origin sources. The CDN therefore uses the memory and/or storage resources of the servers to accelerate content delivery. However, other resources of the servers may be underutilized or unavailable to the users by virtue of the CDN's focus on accelerating content delivery.

DETAILED DESCRIPTION OF PREFERRED EMBODIMENTS

Figure 1:
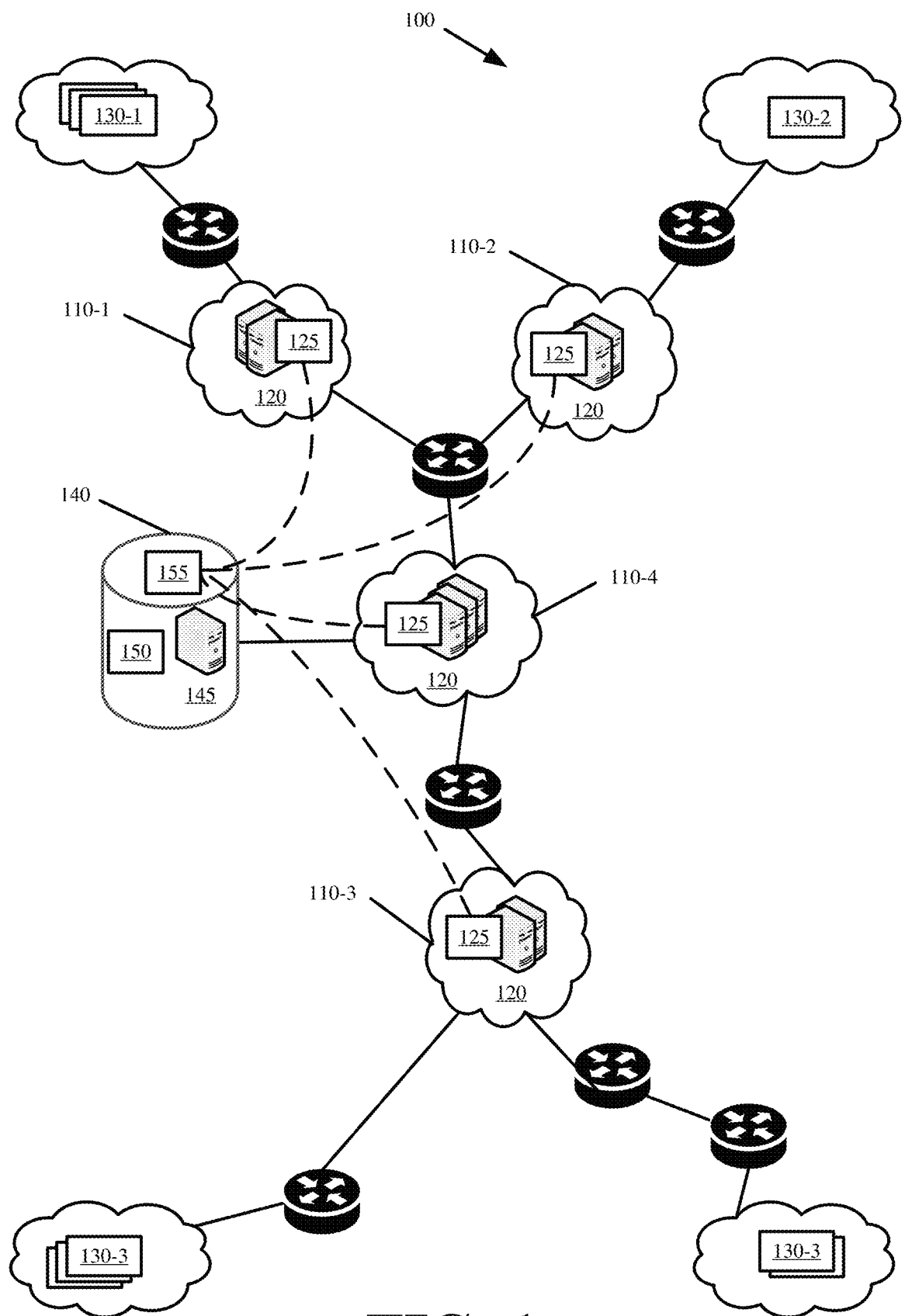
FIG. 1 illustrates an example of an Edge Compute Network ("ECN") in accordance with some embodiments described herein.

The following detailed description refers to the accompanying drawings. The same reference numbers in different drawings may identify the same or similar elements.

"Cloud computing" allows users to offload computational tasks from their own local devices to remote network devices that are operated by a cloud service provider. For instance, a user may obtain an allocation of compute resources from a compute cluster that is operated by the cloud service provider somewhere in the network. The user may access the allocated compute resources, create a cloud instance or virtual machine, install software and/or other dependencies to the cloud instance or virtual machine, write a set of operations in a programming language that can be executed by the installed software and/or that is supported by the created cloud instance or virtual machine, and execute the set of operations via remote calls to the cloud instance or virtual machine.

Some advantages of cloud computing may include removing hardware costs and hardware management overhead from the user. Some disadvantages of cloud computing may include imposing significant configuration overhead on the user by requiring the user to have deep technical knowledge of the cloud computing architecture, requiring the user to adapt their code to languages, software, and/or other dependencies supported by the cloud service provider, and/or other steps that the user has to perform before being able to execute the set of operations on the cloud computing resources.

Other disadvantages may stem from the cloud computing architecture. In particular, the compute resources that different users have access to may be located in a centralized data center or a centralized compute cluster. Accordingly, there may be significant latency associated with transmitting a request to execute one or more operations on the compute resources, and receiving the executed results, especially when the requests originate from users at different points in the network that may be further away from the compute resources. The network traversals may add tens or hundreds of milliseconds to the time for executing the operations on the compute resources. The added latency may prevent real-time or latency sensitive applications or services from running in the cloud.

To address and overcome these and other shortcomings of a centralized cloud computing architecture, systems and/or methods, as described herein, provide an Edge Compute Network ("ECN"). The ECN may provide compute devices with configurable compute resources at different network edges and/or geographical locations. The ECN localizes and provides low latency execution of user-defined operations by executing the operations using the compute resources of a compute device that is located closest to a requesting user.

Additionally, the ECN may provide one or more function managers to manage the compute resources of the compute devices, and to automatically initialize an executable environment for each set of user-defined operations so that different sets of user-defined operations can be executed directly on the compute resources of the compute devices. More specifically, the ECN allows a user to provide the code for a set of operations in any of several supported programming languages and/or programming paradigms. The ECN may create, with little or no input from the user, an executable environment that enters the set of operations in an image or container with additional software, dependencies, and/or configuration to execute the set of operations using the compute resources of one or more compute devices. In some embodiments, the set of operations may correspond to a function, application, program, script, code, and/or software that produces some result or output based on executed instructions.

The function manager may selectively initialize the executable environment for a set of operations on the one or more compute devices of the ECN that are closest to where the set of operations is accessed and/or requested. The function manager may manage the compute resources of the one or more compute devices to ensure resource availability for requested user-defined operations by removing the executable environments for sets of user-defined operations that are unused or underutilize. Accordingly, each function manager may automate deployment and/or execution of user-defined operations on one or more of the compute devices in a manner that parallels the simplicity and ease with which users provide content for redistribution in a Content Delivery Network ("CDN"), and in a manner that parallels content caching and content purging policies of the CDN.

FIG. 1 illustrates an example of ECN 100 in accordance with some embodiments described herein. ECN 100 may be a distributed platform that executes different sets of user-defined operations (e.g., user-defined functions, applications, programs, scripts, code, and/or software) from different Points-of-Presence ("PoPs") 110-1, 110-2, 110-3, 110-4 (herein sometimes collectively referred to as "PoPs 110" or individually as "PoP 110") that are closest to where execution of each set of user-defined operations is requested. ECN 100 may include more or fewer PoPs 110 based on a larger or smaller distributed presence and/or demand.

PoPs 110 may be hierarchically arranged. For instance, PoPs 110-1, 110-2, and 110-3 may be first-tier PoPs, and PoP 110-4 may be a second-tier PoP of ECN 100. Each first-tier PoP 110-1, 110-2, and 110-3 may receive requests for execution of different sets of user-defined operations from a different subset of users 130 operating from nearby geographic locations. For instance, requests to execute a particular set of operations from users 130-1 may route to PoP 110-1, whereas requests to execute the same particular set of operations from users 130-2 may route to PoP 110-2. The hierarchical arrangement allows for a request, that is initially received by a first-tier PoP, to be executed at the second-tier PoP or higher-tier PoPs, when the requested set of operations is not configured and/or initialized at the first-tier PoP and results in a "function miss", and the requested set of operations is configured and/or initialized at the second-tier PoP or higher-tier PoPs.

PoPs 110 may be accessed via a common network address. For instance, each PoP 110 may be accessed with a shared Anycast address, and Anycast routing may route user-issued requests, that are directed to the Anycast address and that request execution of a particular set of operations, to the closest PoP 110. The closest PoP 110 may be determined based on Border Gateway Protocol ("BGP") routing tables, a number of network hops, latency, and/or other criteria. In some embodiments, each PoP 110 may be assigned a different network address, and Domain Name System ("DNS") request resolution may be used to resolve requests with a common domain name (e.g., "exampleECN-.com") to the network address of a geographically closest PoP 110.

Each PoP 110 may include one or more compute devices 120 that have configurable compute resources, and one or more function managers 125 to manage the compute resources and the executable environments for different sets of user-defined operations (e.g., user-defined functions, applications, programs, scripts, codes, and/or software). In some embodiments, a different instance of function manager 125 runs in conjunction with each compute device 120. In some other embodiments, function manager 125 may be a device that is separate from compute devices 120 in a PoP 110, and a single instance of function manager 125 may manage the compute resources and the executable environments for multiple compute devices 120 in the same PoP 110.

The configurable compute resources of a particular compute device 120 may include processor, memory, storage, and/or other hardware resources of the particular compute device 120 that can be configured and/or used to execute different sets of operations on behalf of different users 130. Each PoP 110 may include the same or different number of compute devices 120, and each compute device 120 may have the same or different compute resources than other compute devices 120 in the same PoP 110.

Each compute device 120 in a PoP 110 may be assigned different network addresses, and may execute different sets of user-defined operations. Requests to execute a set of operations may be addressed to a network address of a PoP 110, and a load balancer or director (not shown in FIG. 1) in that PoP 110 may perform a persistent distribution of the requests across compute devices 120 in that PoP 110 so that requests for execution of a particular set of operations (e.g., the same function, application, program, etc.) are issued to a common compute device 120 that has initialized the executable environment for that particular set of operations, and/or that is tasked with executing that particular set of operations. Since requests may be routed to different PoPs 110, compute devices 120 in different PoPs 110 may be configured and/or initialized with executable environments for executing different sets of user-defined operations.

In some embodiments, function manager 125 may build and/or retrieve the executable environment for a set of user-defined operations in response to that function manager 125 or an associated compute device 120 receiving one or more requests to execute that set of user-defined operations. Function manager 125 may also control the deployment, initialization, and/or removal of executable environments for different sets of user-defined operations on one or more compute devices 120. In some embodiments, function manager 125 may monitor usage of the compute resources of one or more compute devices 120 as well as execution of different executable environments for different sets of user-defined operations in order to determine which executable environments to deploy, initialize, retain, and/or remove from the compute devices 120.

ECN 100 may also include a compute origin PoP 140 with one or more compute origin devices 145, repository 150, and image registry 155. Compute origin devices 145 may include dedicated devices that have initialized and that run the executable environment for each set of user-defined operations uploaded to ECN 110. In other words, compute origin devices 145 may initialize and run the executable environment for all sets of user-defined operations regardless of whether those sets of user-defined operations are requested from compute origin PoP 140 by any users 130. The operation of compute origin devices 145 may therefore be different than the operation of compute devices 120 in each particular PoP 110, because compute devices 120 in a particular PoP 110, via operation of the corresponding function managers 125, may selectively initialize and run the executable environment for sets of user-defined operations that are requested from that particular PoP 110 by users 130.

Repository 150 may include one or more repositories and/or storage devices for receiving and storing sets of user-defined operations from users 130. More specifically, repository 150 may receive the functions, applications, programs, scripts, code, and/or software that are written by users, and that the users offload to ECN 100 for distributed execution from PoPs 110. The sets of user-defined operations may be in any one of several supported programming languages. For instance, compute resources of ECN 100 may execute sets of operations written in Python, NodeJS, JavaScript, C++, C #, C, Ruby, Perl, and/or other scripting and programming languages. In other words, users simply upload their code, and ECN 100 produces the appropriate executable environment to run the user-defined code on any of compute devices 120.

Image registry 155 may include a process that builds the executable environment for each set of user-defined operations. The executable environment includes a set of user-defined operations in a logical package or standardized unit that can be run and/or executed from any compute device 120 and compute origin device 145 of ECN 100 regardless of the language, format, and/or other properties of the set of user-defined operations. In particular, the executable environment may be an image, container (e.g., Docker, Kubernetes, etc.), virtual machine, or other package that incorporates a set of user-defined operations with other software and dependencies (e.g., code, runtime, system libraries, etc.) so that the set of user-defined operations within the executable environment can be run directly on the operating system or within the kernel of a compute device 120 or compute origin device 145.

In some embodiments, a PoP 110 may receive one or more user requests to execute a set of operations using compute resources of that PoP 110. In response to the user requests, one or more function managers 125 in that PoP 110 may selectively retrieve the executable environment for the requested set of operations from image registry 155, and may initialize the executable environment on one or more compute devices 120 of that PoP 110 that will be used to execute the requested set of operations.

Function managers 125 may perform the executable environment retrieval based on different policies. For instance, when implementing a first-hit initialization policy, a first request for execution of a set of operations at first-tier PoP 110-1 may result in a function miss, and the request may be forwarded to second-tier PoP 110-4 while function manager 125 in first-tier PoP 110-1 retrieves the executable environment for the requested set of operations, and initializes the executable environment on a compute device 120 in first-tier PoP 110-1. Thereafter, compute device 120 in first-tier PoP 110-1 with the initialized execution environment may execute the set of operations and may provide output in response to subsequent requests for execution of the same set of operations. In some other embodiments, function managers 125 may retrieve a requested set of operations from repository 150, may build the executable environment for that set of operations, and may deploy and/or initialize the executable environment on a compute device 120 that will be used to execute the set of operations.

In some embodiments, the architecture of ECN 100 may resemble the architecture of a CDN. Accordingly, ECN 100 may be integrated as part of a CDN, and/or may use existing resources of the CDN to provide the configurable edge computing services for different users. For instance, ECN 100 may adapt the CDN caching servers for low latency user configurable function execution. The CDN caching servers can continue to accelerate content delivery by caching and serving cached content in response to user requests for the cached content, and compute resources of the same CDN caching servers can be used to execute different sets of user-defined operations from different PoPs of the CDN in response to user requests for execution of the different sets of user-defined operations.

In some other embodiments, ECN 100 may be an independent distributed platform that is optimized for function execution and/or for providing edge compute functionality. For instance, compute devices 120 of ECN 100 may have less storage than caching servers of a CDN, and may have more powerful processors or more processors than the CDN caching servers.

Figure 2:
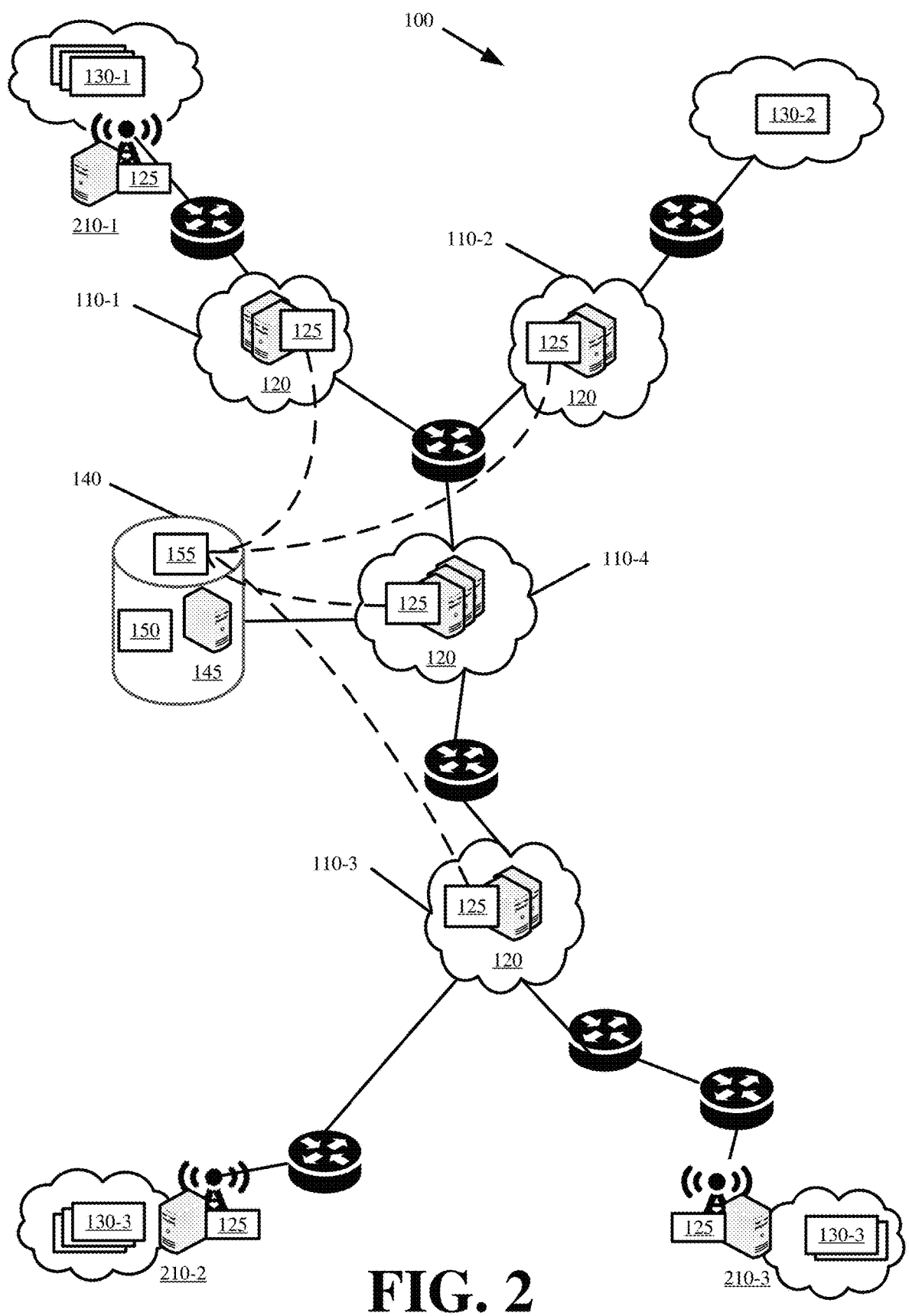
FIG. 2 illustrates expanding the ECN to include Multi-Access Edge Computing ("MEC") devices of a telecommunications network and/or other MEC operator in accordance with some embodiments described herein.

ECN 100 may also integrate with and/or use Multi-Access Edge Compute ("MEC") devices provided by a telecommunications network and/or other MEC operator. FIG. 2 illustrates expanding ECN 100 to include MEC devices 210-1, 210-2, and 210-3 (herein sometimes collectively referred to as "MEC devices 210" or individually as "MEC device 210") of a telecommunications network and/or other MEC operator in accordance with some embodiments described herein.

MEC devices 210 may include configurable compute and/or other resources that may be located at or near different network points of entry. For instance, MEC devices 210 may be deployed and/or operated by a telecommunications network operator at or near one or more Radio Access Networks ("RANs") and/or base stations of the telecommunications network, and may be used to provide low latency content distribution, services, processing, and/or data to users that operate from the network point(s) of entry associated with each MEC device 210. MEC devices 210 may provide the same, more, or less compute resources than compute devices 120 in PoPs 110. For instance, each MEC device 210 may serve a smaller set of users than each compute device 120, and may therefore have fewer compute resources available for execution of user-defined operations.

In some embodiments, MEC devices 210 may be geographically closer (e.g., fewer network hops and/or less latency) to a subset of users than a nearest PoP 110. Accordingly, MEC devices 210 may provide an additional tier of configurable compute resource to ECN 100, and MEC devices 210 may be interchangeably referred to as compute devices 210 of ECN 100.

In some embodiments, ECN 100 may be a distributed platform that is run independently of the telecommunications network with MEC devices 210, but the telecommunications network may provide ECN 100 access to use compute resources of MEC devices 210, and to integrate those compute resources with the compute resources of compute devices 120 in PoPs 110. In some other embodiments, a single entity may deploy, manage, and/or operate the compute resources of MEC devices 210, compute devices 120, and/or other components of ECN 100.

In any case, each MEC device 210 may run an instance of function manager 125. Function managers 125 for MEC devices 210 may use the same or different policies as function managers 125 for compute devices 120 to control the compute resources of MEC devices 210, the initialization of executable environments on the compute resources, and the removal of the executable environments from the compute resources.

Moreover, function managers 125 may operate in a collective manner to automate the deployment of the user-defined operations to different parts of ECN 100 for most efficient execution. Users do not have to guess or specify where their set of operations should execute from within the network for best performance (e.g., lowest latency). The distributed footprint of ECN 100 along with the operation of function managers 125 ensures that each request to execute a set of operations is processed using the closest available compute resources of ECN 100.

The automated deployment, management, and/or removal of the user-defined operations on different compute resources is performed by function managers 125 in a manner that mirrors content upload and distribution on caching servers of a CDN. For instance, a user may upload a function to repository 150 similar to publishing or uploading content to a CDN. One or more function managers 125 may automatically configure compute resources of ECN 100 with an executable environment for the user-defined function on the compute resources closest to where the function is accessed in a manner that is similar to caching servers of the CDN caching customer content on the caching resources closest to where the content is accessed. Function managers 125 may also manage resources that are allocated to a configured function, and may remove a function from a corresponding compute device when the function is no longer accessed or requested similar to how CDN caching servers free cache to store new or relevant content.

Figure 3:
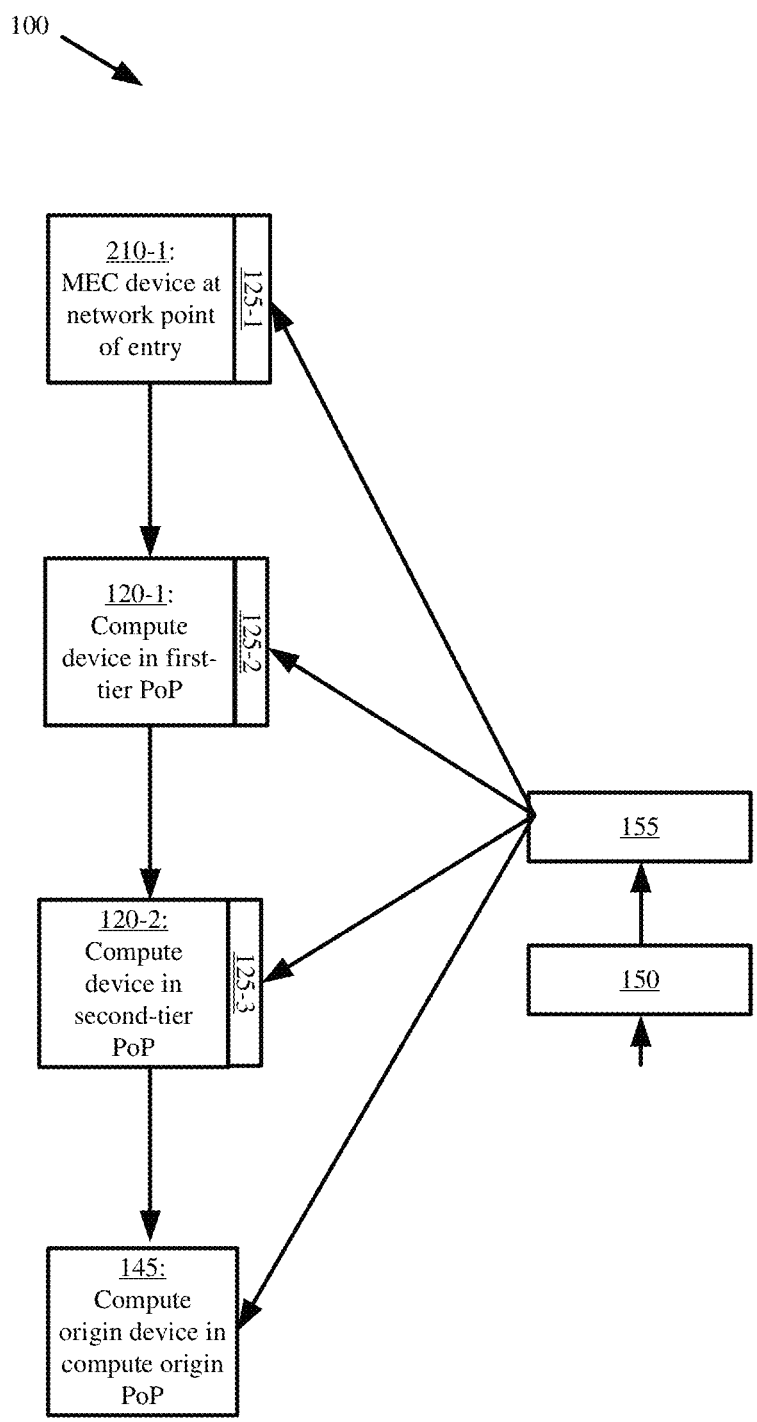
FIG. 3 conceptually illustrates a distributed compute hierarchy of the ECN in accordance with some embodiments presented herein.

FIG. 3 conceptually illustrates the distributed compute hierarchy of ECN 100 in accordance with some embodiments presented herein. As shown, the distributed compute hierarchy may be formed from MEC device 210-1 with first function manager 125-1 operating from a network point of entry, compute device 120-1 with second function manager 125-2 operating from a first-tier PoP (e.g., PoP 110-1), compute device 120-2 with third function manager 125-3 operating from a second-tier PoP (e.g., PoP 110-4), compute origin device 145 operating from a compute origin PoP (e.g., PoP 140), image registry 155, and repository 150. Each function manager 125 and compute origin device 145 may be connected to or have access to repository 150 and/or image registry 155.

Devices 120 (e.g., devices 120-1 and 120-2 in FIG. 3) and 145 may connected hierarchically such that MEC device 210-1 and first function manager 125-1 may be a first number of network hops or first amount of latency away from a set of users, compute device 120-1 and second function manager 125-2 may be a second number of network hops or second amount of latency away from the set of users, compute device 120-2 and second function manager 125-3 may be a third number of network hops or third amount of latency away from the set of users, and compute origin device 145 may be a fourth number of network hops or fourth amount of latency away from the set of users. The first number of network hops may be less than the second number of network hops, the second number of network hops may be less than the third number of network hops, and the third number of network hops may be less than the fourth number of network hops. Similarly, the first amount of latency may be less than the second amount of latency, the second amount of latency may be less than the third amount of latency, and the third amount of latency may be less than the fourth amount of latency.

Figure 4A:
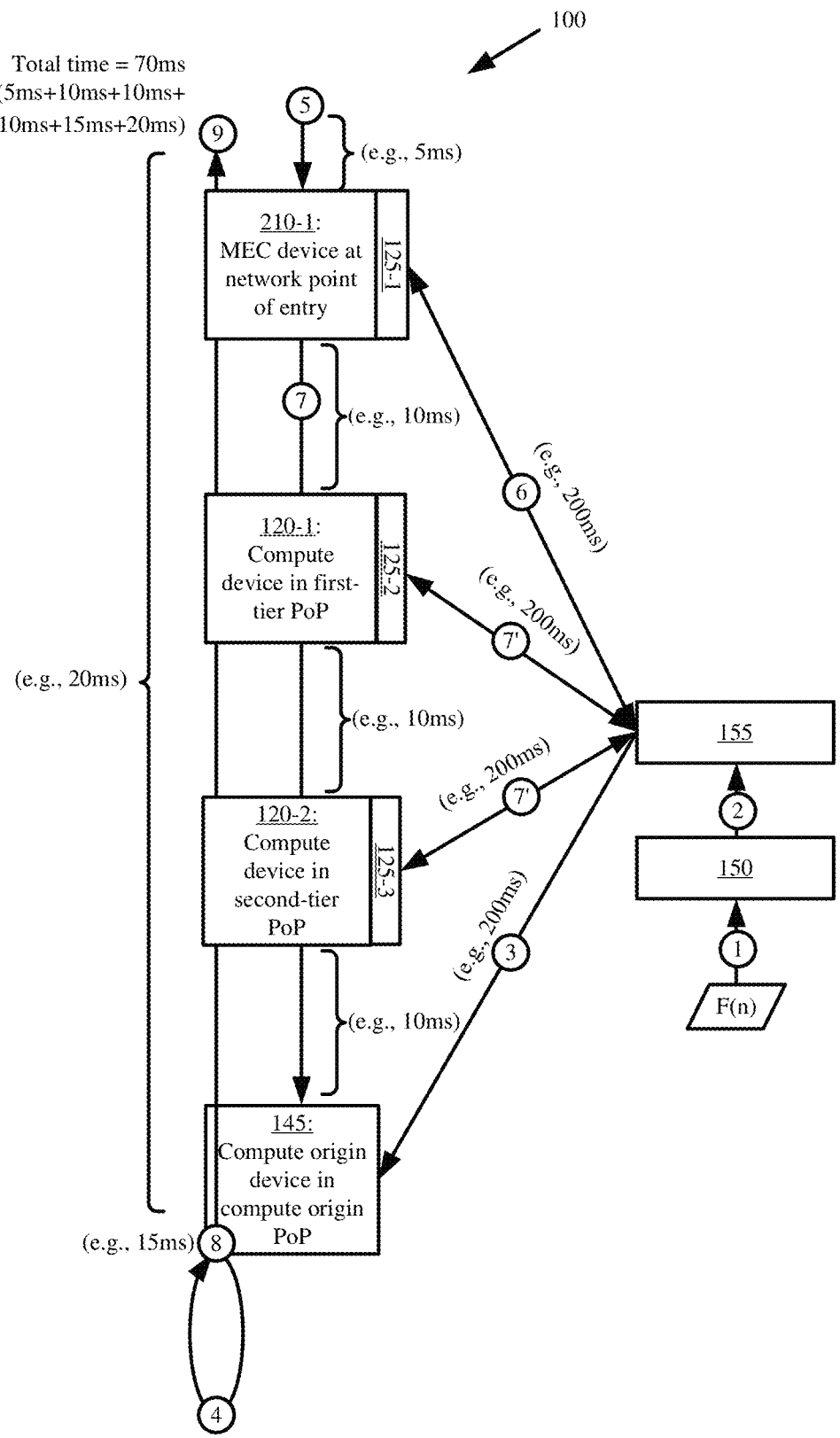
FIGS. 4A and 4B illustrate initializing the distributed compute hierarchy of the ECN for localized and low latency execution of user-defined operations in accordance with some embodiments described herein.
Figure 4B:
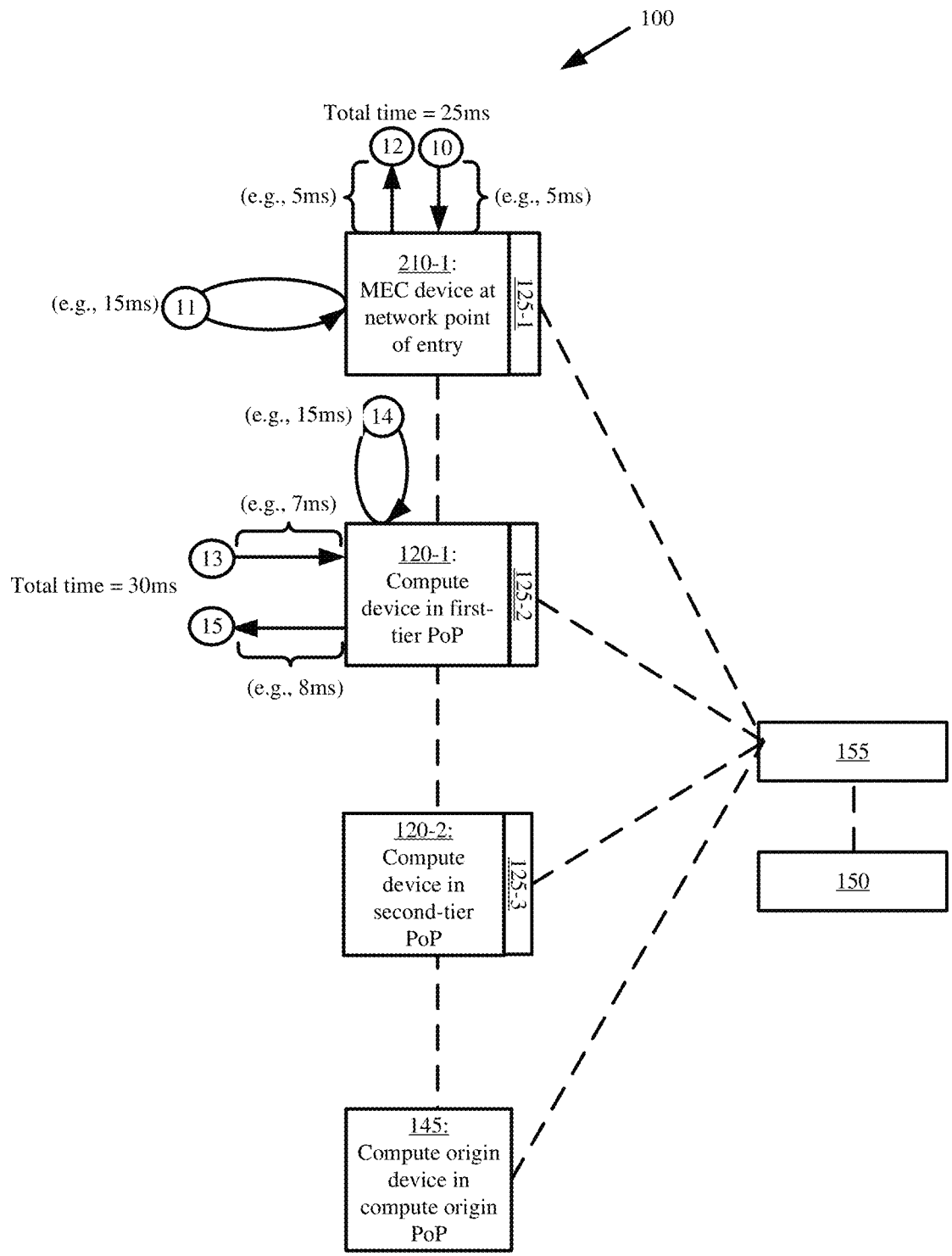

FIGS. 4A and 4B illustrate initializing the distributed compute hierarchy of ECN 100 for localized and low latency execution of user-defined operations in accordance with some embodiments described herein. As shown in FIG. 4A, a user may enter (at 1) a function with a set of user-defined operations into repository 150. The user may access a portal in order to enter (at 1) the function into repository 150. For instance, the user may direct a browser to a Uniform Resource Locator ("URL") or network address of the portal, and then write, copy-and-paste, or upload the function code to repository 150. The user may alternatively submit the function to repository 150 via network messaging that is directed to the URL or network address of repository 150. For instance, the function code may be contained in the payload of one or more data packets issued to repository 150.

In response to repository 150 receiving the user-defined function, image registry 155 may build (at 2) an executable environment for the user-defined function. In some embodiments, repository 150 may include a monitoring process that monitors for a push event, such as entry of a function into repository 150 or modification of an existing set of user-defined operations or user-defined functions. Entering (at 1) the function to repository 150 may trigger the push event, and may cause image registry 155 to retrieve the function associated with the push event from repository 150, and to build (at 2) the executable environment for that function.

In some embodiments, building (at 2) the executable environment may include entering the function in an image, container, virtual machine, or other package with other software and/or dependencies (e.g., runtime libraries, environment variables, etc.) that compute devices 120 (e.g., MEC devices 210) and 145 may use to execute the function. In some embodiments, the operating system and/or kernel of compute devices 120 and 145 may directly execute the executable environment. In some such embodiments, the executable environment may include the necessary software and/or dependencies to execute the function, coded in any one of several different supported languages, on the operating system and/or kernel of compute devices 120 and 145. In some other embodiments, the executable environment may include its own virtualized operating system that executes the function on compute devices 120 and 145 via a hypervisor layer or other intermediary layer.

In some embodiments, compute origin device 145 may continually poll image registry 155 for new or updated executable environments. In some other embodiments, image registry 155 may push each newly generated or modified executable environment to compute origin device 145. In any case, compute origin device 145 may receive (at 3) the executable environment that is created for the function from image registry 155, and may initialize (at 4) the executable environment.

Initializing (at 4) the executable environment may include configuring the executable environment so that it may run using processing, memory, and/or other resources of compute origin device 145 when the corresponding function is called. For instance, initializing (at 4) the executable environment may include allocating compute resources for use in executing the executable environment. Further description for initializing an executable environment is provided below with reference to FIG. 5.

A user may issue (at 5) a request to call the function. The request may route (at 5) to MEC device 210-1 (e.g., a first-tier compute device of ECN 100) based on network proximity between the user and MEC device 210-1. For instance, the user may operate from within a network point of entry where MEC device 210-1 is located.

First function manager 125-1, running in conjunction with MEC device 210-1, may detect that the request is directed to the edge compute offering of ECN 100, and in particular, to execution of a set of user-defined operations (e.g., the function provided (at 1) by the user). Since the request is the first received request for the user-defined function, first function manager 125-1 may determine that the request results in a function miss as a result of the executable environment for the requested function not being initialized or stored on MEC device 210-1.

In response to the function miss, first function manager 125-1 may retrieve (at 6) the executable environment for the requested function from image registry 155, may initialize the executable environment on MEC device 210-1, and may forward (at 7) the request down the distributed compute hierarchy of ECN 100 to next-tier compute device 120-1 or next-tier function manager 120-2. In some embodiments, first function manager 125-1 may forward (at 7) the request because it may be faster to execute the function elsewhere in ECN 100 where the executable environment is already initialized rather than wait for first function manager 125-1 to request and retrieve the executable environment, initialize the executable environment on compute resources of MEC device 210-1, execute the function within the executable environment using the compute resources of MEC device 210-1, and return the function results.

The forwarded (at 7) request may also result in function misses at the second and third tiers of ECN 100 since the executable environment for the requested function also has not been initialized on compute devices 120-1 and 120-2. At compute devices 120-1 and 120-2 where the request results in a function miss, the function manager running in conjunction with those compute devices (e.g., function managers 125-2 and 125-3) may also retrieve (at 7') the executable environment for the requested function from image registry 155, and may initialize the executable environment.

The request may continue to be forwarded (at 7) until the request reaches compute origin device 145. Since compute origin device 145 has already initialized the executable environment for the requested function (and all other executable environments for sets of user-defined operations or functions uploaded to ECN 100), compute origin device 145 may execute (at 8) the requested function, and may provide (at 9) the result to the requesting user without executable environment initialization delay.

As noted above, executing the initial request at compute origin device 145 may be faster than waiting for any of MEC device 210-1 or compute devices 120-1 and 120-2 to retrieve and initialize the executable environment, because the total time to propagate the request to compute origin device 145 may be less than 50 milliseconds ("ms"), whereas the time to retrieve and initialize the executable environment may be orders of magnitude greater. For the initial request, time to execute the requested function at compute origin device 145 and return the result to the requesting user may be similar to time for executing the same request in a cloud computing platform with a single compute cluster.

However, as was shown in FIG. 4A, each function miss causes ECN 100 to load the executable environment for the requested function at different devices 210-1, 120-1, and 120-2 along the network path to compute origin device 145 such that subsequent requests for the function may be executed closer to the request point of origin and with less latency than when executing the function at compute origin device 145. FIG. 4B illustrates the localized execution provided by ECN 100 for second and/or subsequent requests of the function requested in FIG. 4A in accordance with some embodiments.

FIG. 4B continues from FIG. 4A such that the initial request for the function resulted in function misses at the first, second, and third-tier compute devices (e.g., MEC device 210-1 and compute devices 120-1 and 120-2), and also resulted in function managers 125-1, 125-2, and 125-3 retrieving and initializing the executable environment for the requested function on compute devices 210-1, 120-1, and 120-2 respectively. Accordingly, when a user submits (at 10) a second request for that function, and the second request is received (at 10) by MEC device 210-1 (e.g., the closest compute device in the ECN 110 hierarchy to the user), function manager 125-1 may determine that the executable environment for the requested function has already been initialized on MEC device 210-1, and may call the function to use the compute resources of MEC device 210-1 to execute (at 11) the function, and to provide (at 12) the function result to the requesting user without having to access compute devices in other tiers of ECN 100 that are more distant to the requesting user.

Similarly, a different second user operating from a different geographic location may issue (at 13) a third request for the function. The third request may first route (at 13) to second-tier compute device 120-1 instead of first-tier compute device 210-1 as a result of second-tier compute device 120-1 being closer to the second user than first-tier compute device 210-1.

Function manager 125-2 may detect that executable environment for the requested function has been initialized on second-tier compute device 120-1 as a result of the first request function miss. Consequently, function manager 125-2 may call the function to use the compute resources of compute device 120-1 to execute (at 14) the function, and to provide (at 15) the function result to the requesting second user without having to access compute devices in other tiers of ECN 100 that are more distant to the requesting second user.

In some embodiments, each newly generated or modified executable environment that is entered in image registry 155 may be immediately pushed to and stored on MEC devices 210 and compute devices 120 of ECN 100. Function managers 125 may then selectively initialize (e.g., allocate resources, load into memory, and run using the allocated resources) the executable environments from local storage of those devices according to an initialization policy. For instance, when a particular compute device 120 receives a certain number of requests to execute a particular function and the number of requests satisfies the initialization policy, the function manager 125 for that particular compute device 120 may identify the executable environment for that particular function stored on local storage of compute device 120, and may initialize the identified executable environment without retrieving the executable environment from image registry 155.

Figure 5:
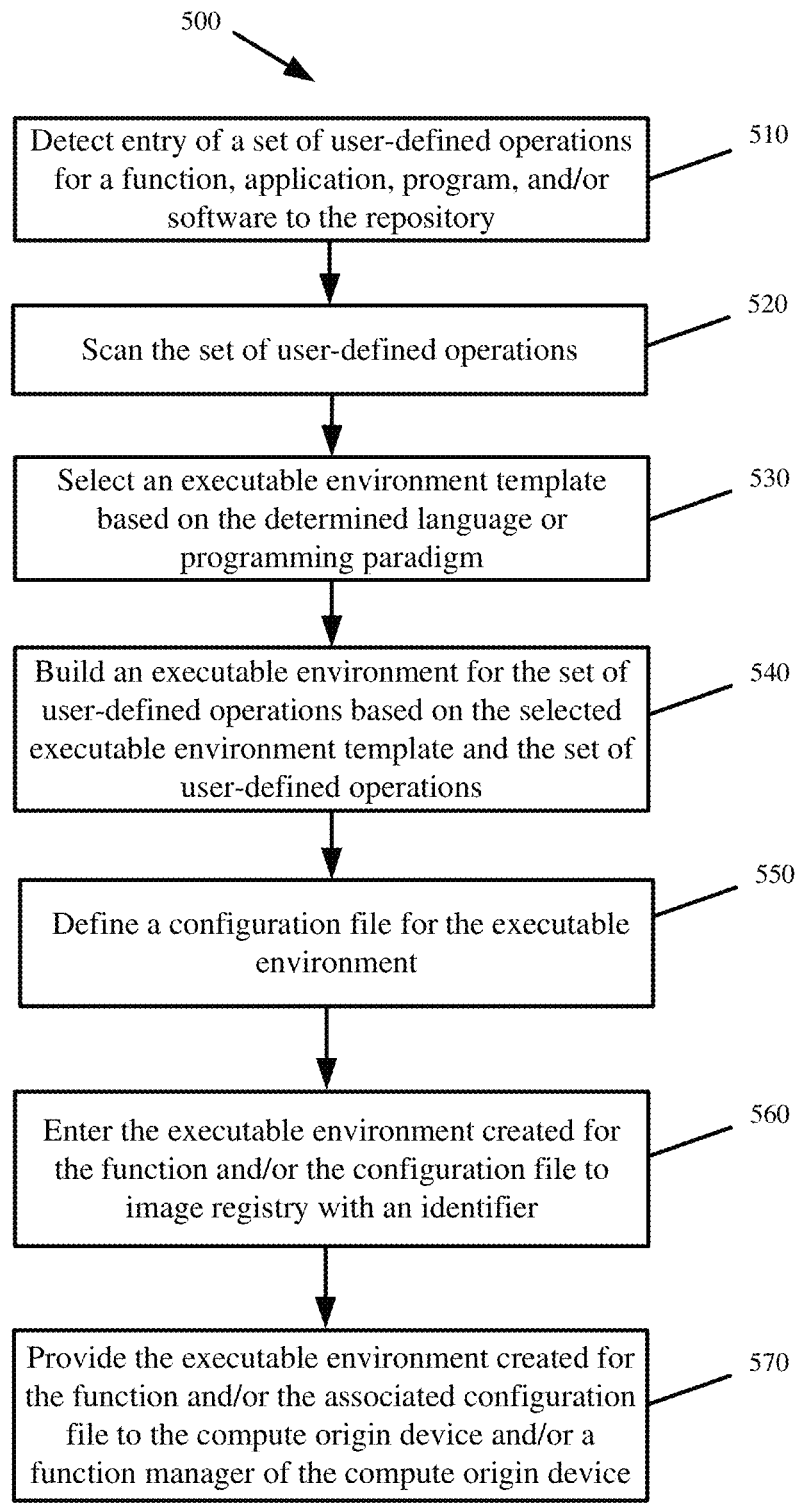
FIG. 5 presents a process for automatically building the executable environment for a set of user-defined operations in accordance with some embodiments described herein.

FIG. 5 presents a process 500 for automatically building the executable environment for a set of user-defined operations in accordance with some embodiments described herein. Process 500 may be performed image registry 155 and/or a function manager 125 running at compute origin PoP 140.

Process 500 may include detecting (at 510) a user committing a set of user-defined operations for a function, application, program, and/or software to repository 150. As noted above, repository 150 and/or image registry 155 may run a monitoring process to detect when a set of user-defined operations are committed to repository 150.

The set of user-defined operations may include code in one of several supported scripting languages, programming languages, and/or other computer programming paradigms. The set of operations may specify instructions to be executed by one or more MEC devices 210 and/or compute devices 120 of ECN 100. The set of operations may include input parameters. The input parameters may specify inputs that can be provided and used when executing the set of operations. In some embodiments, the inputs may be provided as files or data in the payload of one or more data packets used to call a set of operations. The set of operations may also specify output that is returned as a result of executing the set of operations. The user may commit the set of operations to repository 150 by entering the set of operations as a file and/or code. The user may add a new set of user-defined operations, or may modify an existing set of user-defined operations (e.g., change the code for a function that was previously entered to repository 150).

In response to detecting (at 510) the new function, process 500 may include scanning (at 520) the set of operations. Process 500 may scan (at 520) the set of operations in order to determine the language and/or programming paradigm used to define the set of operations.

Process 500 may include selecting (at 530) an executable environment template based on the determined language or programming paradigm. The executable environment template may include an image, container, virtual machine, or other package that provides the dependencies, runtime environment, system libraries, and/or other software with which the compute resources of a compute device may directly execute the set of operations in the specified language or programming paradigm. For instance, the executable environment template for a Ruby defined function may provide a Ruby runtime environment with configured environment variables, one or more libraries and/or packages for running the Ruby runtime environment on the operating system of a compute device 120, and/or other configurable parameters. In some embodiments, image registry 155 contains one or more executable environment templates to support different sets of user-defined operations in Python, NodeJS, JavaScript, C++, C #, C, Ruby, Perl, and/or other scripting and programming languages.

Process 500 may include building (at 540) an executable environment for the set of user-defined operations based on the selected executable environment template and the set of user-defined operations. Building the executable environment may include embedding the set of user-defined operations in the template, linking the set of user-defined operations to the software required to execute the set of user-defined operations, and/or configuring environment variables and/or other parameters of the template.

Process 500 may include defining (at 550) a configuration file for the executable environment. The configuration file may specify the compute resources that a compute device may allocate to the set of user-defined operations and/or the executable environment, or the compute resources that may be used when executing the set of user-defined operations from the executable environment. For instance, the configuration file may restrict processor, memory, and/or storage resources based on time, usage, availability, and/or other factors. The configuration file may differ for different users and/or sets of user-defined operations. The configuration file may be defined according to user specified parameters and/or parameters set for different users. For instance, a particular user may define a function that requires a large amount of compute power. Accordingly, the particular user may request and/or pay for a larger (e.g., up to 80% of the processor cycles) and/or longer allocation of compute power from one or more compute devices, and the allocation may be entered in the associated configuration file for that function. Another user may identify a latency sensitive set of operations whose execution may be prioritized when called, and the configuration file may provide the prioritized access to the compute resources when the latency sensitive set of operations are called and executed.

Process 500 may include entering (at 560) the executable environment created for the function and/or the associated configuration file to image registry 155 with an identifier that can be used to retrieve the executable environment and/or the resource configuration. The identifier may be a URL with a path and/or filename that identifies the executable environment and/or the function included in the executable environment.

Process 500 may also include providing (at 570) the executable environment created for the function and/or the associated configuration file to compute origin device 145 and/or a function manager of compute origin device 145 for immediate initialization thereon. In doing so, ECN 100 guarantees that each executable environment is initialized and can be immediately executed in response to a request from at least one compute device (e.g., compute origin device 145) of ECN 100.

As noted above, ECN 100 does not initialize the executable environment for each set of user-defined operations on every MEC device 210 or compute device 120 of ECN 100. Doing so would be wasteful as some sets of user-defined operations may go unused in certain geographic locations or may not be called by users in those geographic locations. Accordingly, ECN 100 uses function managers 125 to selective initialize the executable environments on different subsets of MEC devices 210 and/or compute devices 120 based on different initialization policies. However, to reduce executable environment initialization time, process 500 may include distributing the executable environment to all MEC devices 210 and compute devices 120 or their function managers 125, and storing the executable environment without initialization on local storage of each device.

Figure 6:
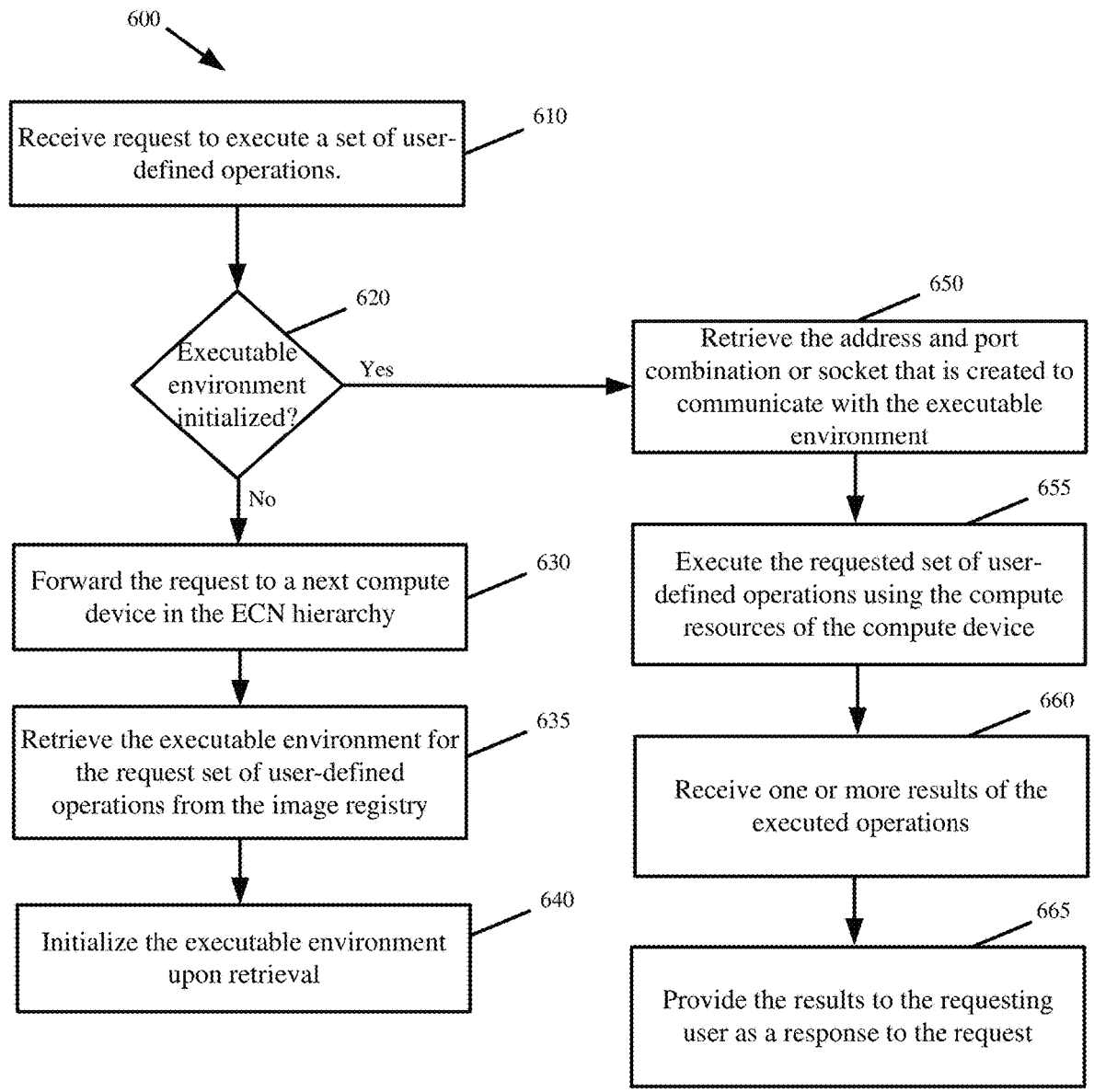
FIG. 6 presents a process for initializing an executable environment on compute resources of a compute device based on an initialization policy in accordance with some embodiments described herein.

FIG. 6 presents a process 600 for initializing an executable environment on compute resources of a compute device based on an initialization policy in accordance with some embodiments described herein. Process 600 may be performed by function manager 125 that controls the initialization of executable environments on one or more compute devices (e.g., MEC devices 210 and/or compute devices 120) of ECN 100. Example process 600 is based on a first-hit initialization policy that is similar to the initialization policy illustrated with reference to FIGS. 4A and 4B above.

Process 600 may commence in response to receiving (at 610) a request to execute a set of user-defined operations. The request may include a URL and/or identifier that identifies the requested set of user-defined operations. For instance, the request URL may include a domain name, first path, or first identifier that causes the request to route to a particular compute device, and to be received by a function manager running in conjunction with that particular compute device. The URL may include a second path or a second identifier that identifies the user that provided the set of user-defined operations (e.g., a unique ECN customer identifier), and a third path or a third identifier for the set of user-defined operations that is requested. The third path or third identifier may, for example, specify a function, application, or program name. The request may also include input parameters for the requested set of user-defined operations. The input parameters may be inserted into the URL (e.g., as query string arguments), may be provided in the payload of the request data packet, or may be provided as a file or data submitted in subsequent data packets from the requestor.

In response to receiving (at 610) the request, process 600 may include determining (at 620) if the executable environment for the requested set of user-defined operations is initialized on the compute device. In some embodiments, the determination (at 620) may be based on a hash of the request URL and/or identifier. For instance, the request URL hash result may match to an entry in a configuration of the compute device that identifies initialized executable environments. The matching entry may specify a socket or address and port combination that can be used to call and/or execute the requested set of user-defined operations. When the executable environment has not been initialized on the compute device, the hash result will not match to any entries in the configuration. In some embodiments, the determination (at 620) may be based on extracting one or more identifiers from the request and/or request URL, and traversing a file system of the compute device or function manager to determine whether a folder or directory matching the extracted identifier(s) has been created, and if the folder or directory includes a socket or address and port combination that can be used to call and/or execute the requested set of user-defined operations. In some other embodiments, the request URL may link to other identifiers for interfacing with and/or calling the requested set of user-defined operations.

In response to determining (at 620—No) that the executable environment for the requested set of user-defined operations is not initialized on the compute device, process 600 may include forwarding (at 630) the request to a next compute device in the ECN hierarchy. Process 600 may also include retrieving (at 635) the executable environment and/or configuration file for the requested set of user-defined operations from image registry 155 using the identifier from the request, and initializing (at 640) the executable environment upon retrieval from image registry 155 so that the set of user-defined operations are available and can be directly executed in response to a next request to execute that set of user-defined operations.

In some embodiments, initializing (at 640) the executable environment may include loading the executable environment into memory or storage of the compute device, forking a process to run the executable environment with compute resources allocated according to the configuration file, and generating a socket for inter-process communication with the executable environment. In particular, function manager 125 may interface with the executable environment and/or may call the requested set of user-defined operations via the socket in order to commence execution of the requested set of user-defined operations by the allocated compute resources. Execution results may similarly be returned via the socket. In this manner, function manager 125 may initialize several different executable environments on a compute device, and may execute functions from any of the executable environments by using the correct socket to call the requested functions. Moreover, function manager 125 can individually manage each executable environment including removing unneeded executable environments if needed.

Use of the socket may restrict moving an executable environment from a first compute device to a different second compute device in the same PoP after the executable environment has been initialized (at 640) on the first compute device. Movement of executable environments may be desirable for resource scaling purposes or to provide different and/or specialized resources as demand for different sets of user-defined operations changes within a PoP. For instance, the executable environment may be initialized (at 640) on a first compute device in a PoP with a first set of available compute resources. The first set of compute resources may be insufficient for executing the set of user-defined operations associated with that executable environment as demand increases for that set of user-defined operations or other sets of user-defined operations initialized on the compute device. Alternatively, a second compute device may have specialized hardware (e.g., an encryption chip) that may accelerate the execution of the set of user-defined operations from the executable environment. In either case, the function manager may move the executable environment to the second compute device that has a greater second amount of compute resources or the specialized hardware. In some embodiments, the function manager may duplicate the executable environment on the second compute device for parallel execution of the set of user-defined operations from two different compute devices.

To support such moving or scaling of the executable environments, process 600 may include initializing (at 640) the executable environment by loading the executable environment into memory or storage of a first compute device, forking a process to run the executable environment with compute resources of the first compute device allocated according to the configuration file, and generating a unique Internet Protocol ("IP") address and/or port combination for accessing the executable environment and calling the set of user-defined operations of the executable environment. In some embodiments, the address and/or port combination may be entered as a route in the routing table of the first compute device, a director, or other load balancing appliance running on the compute device or running elsewhere in the PoP such that if the executable environment is moved to a different second compute device, the route associated with the address and/or port combination can be changed and subsequent requests directed to the set of user-defined operations of the executable environment can be correctly routed to the second compute device instead of or in addition to the first compute device.

In response to determining (at 620—Yes) that the executable environment for the requested set of user-defined operations is initialized on the compute device, process 600 may include retrieving (at 650) the address and port combination, socket, or other identifier that is used to access the initialized executable environment. The address and port combination, socket, or other identifier may be stored and retrieved from a file system or directory that corresponds to the URL or other identifier from the request that is used to identify which set of user-defined operations to execute. Alternatively, the address and port combination, socket, or other identifier may be obtained in response to hashing the URL or other identifier from the request.

Process 600 may include executing (at 655) the requested set of user-defined operations using the compute resources of the compute device by sending a command to call the set of user-defined operations. The command may be issued as a request directed to the address and port combination used to access the set of user-defined operations, and the request may be routed within the PoP based on a routing table that links different address and port combinations to different executable environments initialized on different compute devices of the PoP. Alternatively, the command may be issued through a socket when the executable environment is initialized and executed on the compute device receiving the user request. The call may include input parameters that are provided with the request or obtained from elsewhere on compute device or the network. In response to the call, the compute resources of the compute device leverage the software within the executable environment to execute the set of user-defined operations. For instance, the executable environment may allow for a just-in-time compilation of the set of user-defined operations and/or runtime translation of the set of user-defined operations to executable code. Process 600 may include receiving (at 660) one or more results of the executed operations, and providing (at 665) the results to the requesting user as a response to the request.

Process 600 may be adapted for different initialization policies. For instance, if function manager 125 performed a three-hit initialization, function manager 125 may track the number of times each set of user-defined operations is requested. Function manager 125 may use a bloom filter or other data structure to track request counts. Function manager 125 may initialize the executable environment for a requested set of user-defined operations when the requested set of user-defined operations has been requested two previous times under a three-hit initialization policy. However, in response to the first or second request, function manager 125, implementing the three-hit initialization, would not retrieve and/or initialize the executable environment for the requested set of user-defined operations. Other initialization policies may be based on request rates exceeding certain thresholds, and/or available compute resources.

In some embodiments, different function managers 125 may implement different initialization policies. For instance, function managers 125 running in conjunction with compute devices 120 that have fewer compute resources may use a more restrictive initialize policy (e.g., three-hit initialization) to prevent initializing too many executable environments at one time, whereas function managers 125 running in conjunction with compute devices 120 that have more compute resources may use a less restrictive initialize policy (e.g., first-hit initialization) to allow for more simultaneously running executable environments.

Figure 7A:
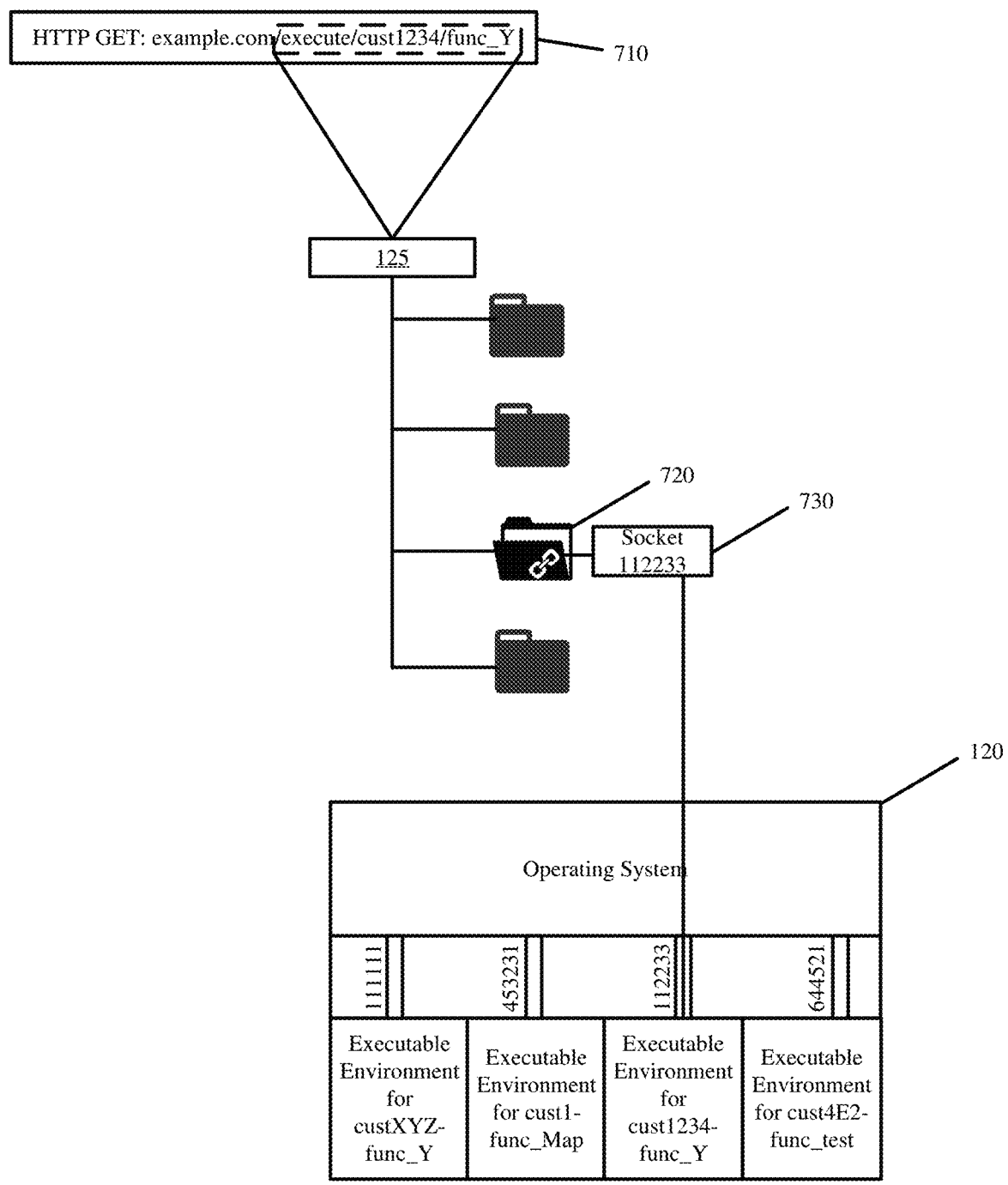
FIGS. 7A and 7B illustrate examples of executing a set of user-defined operations from an initialized executable environment in accordance with some embodiments described herein.
Figure 7B:
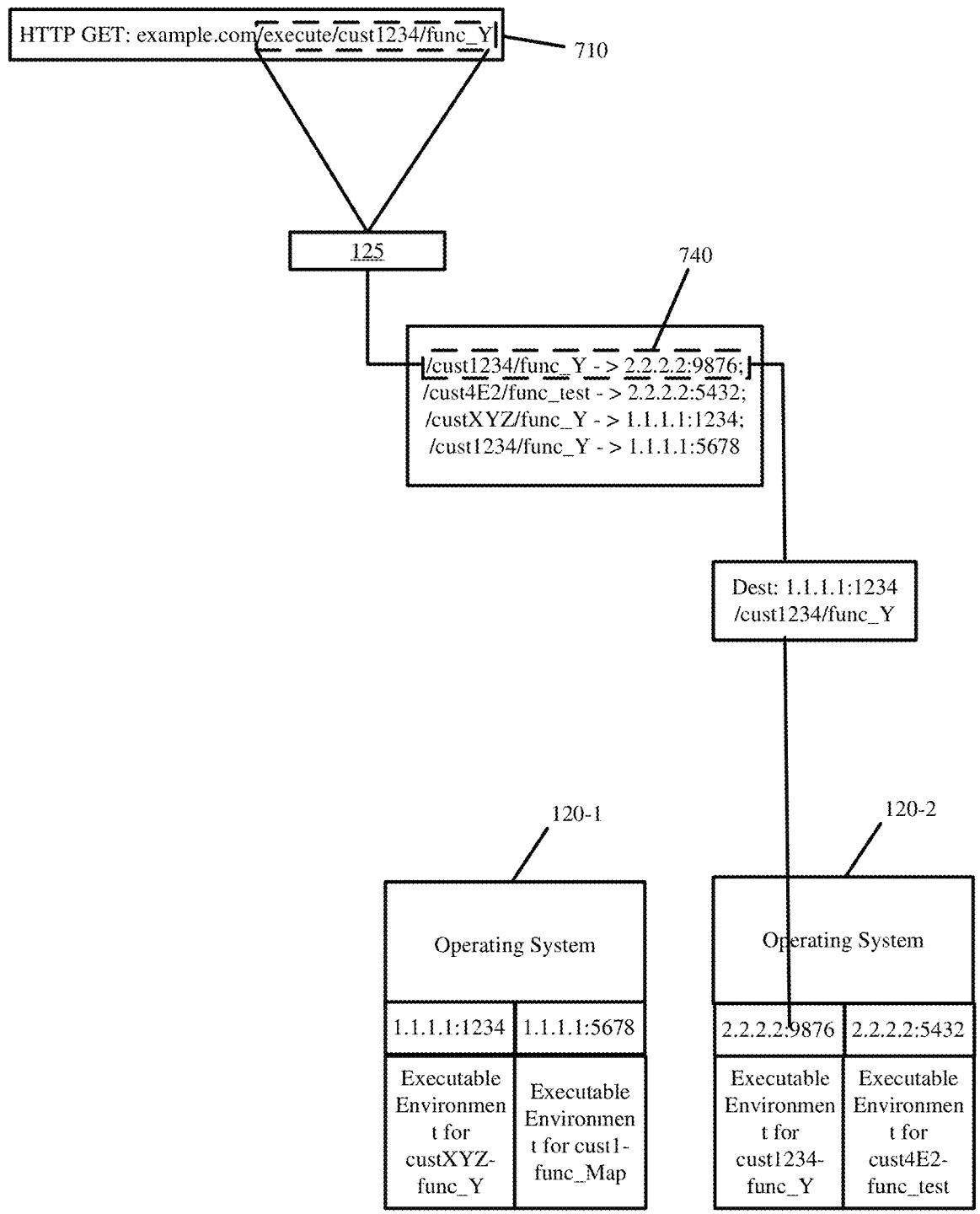

FIGS. 7A and 7B illustrate examples of executing a set of user-defined operations from an initialized executable environment in accordance with some embodiments described herein. As shown in FIG. 7A, request 710 may be made via a HyperText Transfer Protocol (HTTP) GET or POST message. Request 710 may include a URL with one or more identifiers for requesting execution of a particular function. Other messages of the same or other network protocols may also be used to issue request 710.

Function manager 125 may receive request 710, parse the one or more identifiers from request 710, and use the one or more identifiers to locate directory 720. Directory 720 may contain socket 730. The presence of socket 730 in the directory 720 indicates that the executable environment for the requested function has been initialized. Accordingly, function manager 125 may use socket 730 to call the function. In response to calling the function, compute resources of compute device 120 may be used to execute the function.

As shown in FIG. 7B, function manager 125 may hash or otherwise match the URL of request 710 to a unique address and port combination 740 that corresponds to a configured route for calling the particular function identified by the URL of request 710 from second compute device 120-1. Function manager 125 may reissue the request using the address and port combination 740. The reissued request may route to second compute device 120-2, where the executable environment for the requested function has been initialized, based on the configured routes that map different address and port combinations to different compute devices where the executable environments for different functions are initialized.

In addition to initializing the executable environments based on one or more initialization policies, function managers 125 may also be responsible for managing the compute resources on a compute device 120 and ensuring that the compute device 120 has sufficient compute resources to execute operations of the initialized set of executable environments. Accordingly, in some embodiments, function managers 125 may use one or more removal policies to remove initialized executable environments that are no longer needed, used, or deemed important, and to free the corresponding compute resources for the remaining initialized set of executable environments.

The removal policies may include a Least Recently Used ("LRU"), Least Frequently Used ("LFU"), and/or other policies that rely on other criteria to select between initialized executable environments. To perform the removal of initialized executable environments, a function manager 125 may monitor usage of each executable environment initialized on a compute device 120, and/or usage of the compute device's 120 resources.

Figure 8:
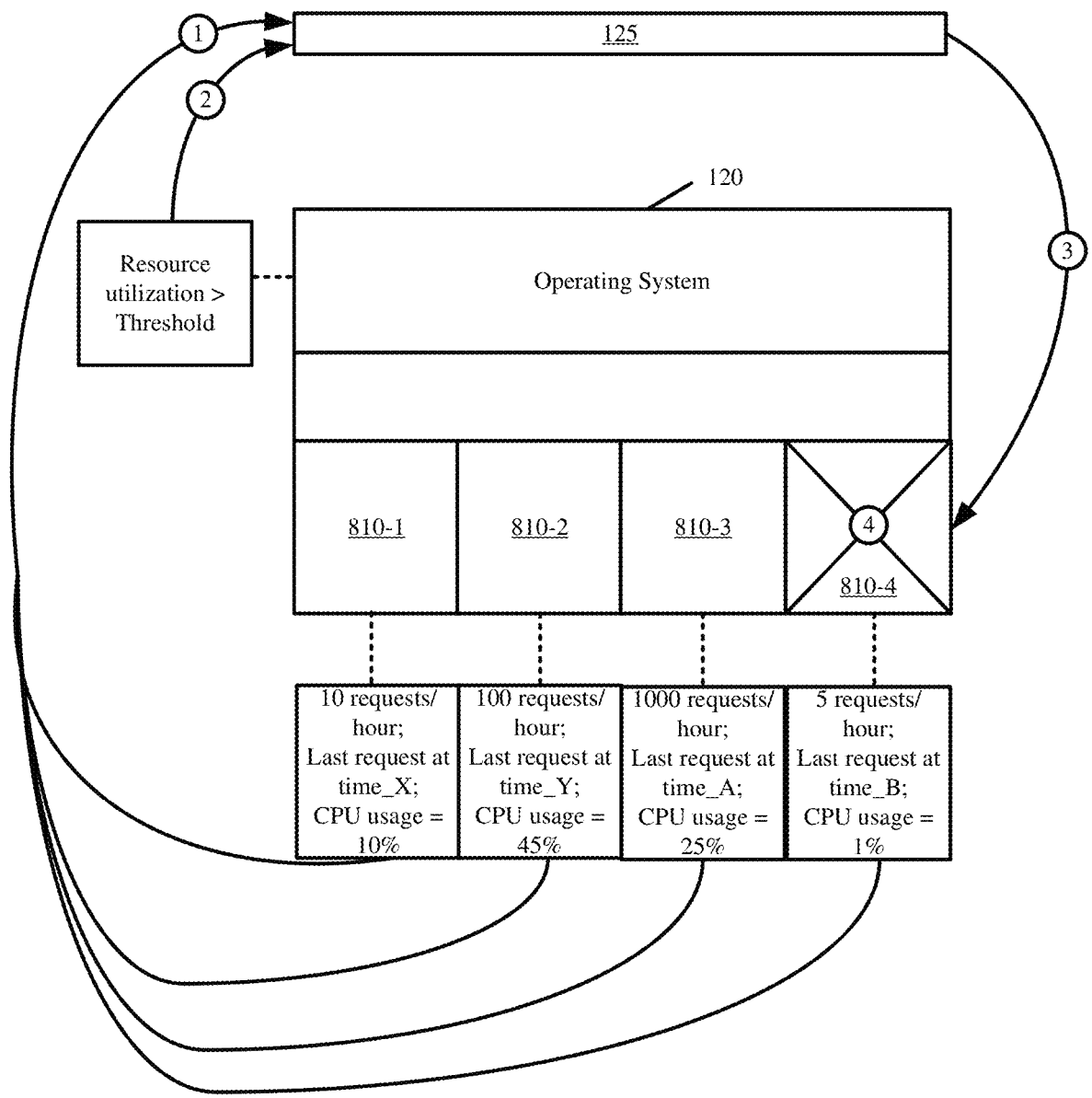
FIG. 8 illustrates an example of a function manager removing initialized executable images based on a removal policy in accordance with some embodiments described herein.

FIG. 8 illustrates an example of function manager 125 removing initialized executable images from compute device 120 based on a removal policy in accordance with some embodiments described herein. As shown in FIG. 8, function manager 125 may track (at 1) different executable environments 810-1, 810-2, 810-3, and 810-4 (herein sometimes collectively referred to as "executable environments 810" or individually as "executable environment 810") that have been initialized on compute device 120. Function manager 125 may track usage of each executable environment 810. The tracked usage may identify the number of times the set of operations associated with each executable environment 810 is called and/or executed over a period of time, the last time each set of operations is called and/or executed, cumulative resource usage from executing the set of operations from each executable environment 810 over time, and/or other metrics. Function manager 125 may also track (at 2) compute resources of compute device 120. For instance, function manager 120 may track available and/or consumed processor, memory, storage, and/or other compute resources of compute device 120.

Function manager 125 may determine, based on the tracked (at 2) compute resources, that the usage of one or more compute resources on computing device 120 exceeds a usage threshold. In response, function manager 125 may execute the removal policy. In some embodiments, function manager 125 may periodically execute the removal policy to preserve resources and free unused resources that are allocated to different executable environments 810.

In response to executing the removal policy, function manager 125 selects (at 3) executable environment 810-4 for removal based on the tracked (at 1) usage of executable environment 810-4 satisfying one or more criteria of the removal policy. For instance, when performing a LRU removal policy, function manager 125 may select one or more initialized executable environments 810 with last request and/or execution timestamps that are further in the past than last request and/or execution timestamps for other initialized executable environments 810, or may select may select one or more initialized executable environments 810 with last request and/or execution timestamps that exceed a threshold time.

The number of the selected executable environments 810 may vary depending on the amount of available resources on compute device 120, and/or the number of initialized executable environments 810 with last request and/or execution timestamps that exceed the threshold time. When performing a LFU removal policy, function manager 125 may select one or more initialized executable environments 810 with request and/or execution rates that are less than request and/or execution rates of other initialized executable environments 810, or that are less than a defined threshold. Here again, the number of selected executable environments 810 may vary depending on the amount of available resources on compute device 120 or other factors.

Function manager 125 may then remove (at 4) selected executable environment 810-4 from compute device 120 such that requests to call the set of operations of executable environment 810-4 may be forwarded to another compute device 120 of ECN 100 for execution for some period of time. Removing (at 4) selected executable environment 810-4 may include deallocating or freeing the compute resources that were allocated to executable environment 810-4. Deallocating the compute resources may include closing and/or terminating the socket that was created to communicate with executable environment 810-4, or removing the route that maps requests for the set of operations of executable environment 810-4 to the unique address and port combination assigned to executable environment 810-4. Removing (at 4) selected executable environment 810-4 may also include deleting executable environment 810-4 from compute device 120 memory and/or storage, or disabling executable environment 810-4 for a period of time such that requests directed to the set of operations of executable environment 810-4 result in a function miss.

In some embodiments, function managers 125 may rely on other devices or components of ECN 100 to manage the lifetime of the initialized executable environments. For instance, function managers 125 may track usage of the executable environments and compute device resources, and may provide the tracked values to image registry 155 or an executable environment management system of ECN 100, such as Kubernetes. In this manner, image registry 155 or the executable environment management system may obtain a holistic view of executable environment usage across ECN 100, rather than independent usage on individual compute devices 120. Image registry 155 or the executable environment management system may then instruct different function managers 125 to scale resources for different executable environments based on global or regional usage, and/or may instruct different function managers to remove certain executable environments based on their usage satisfying one or more removal policies.

Figure 9:
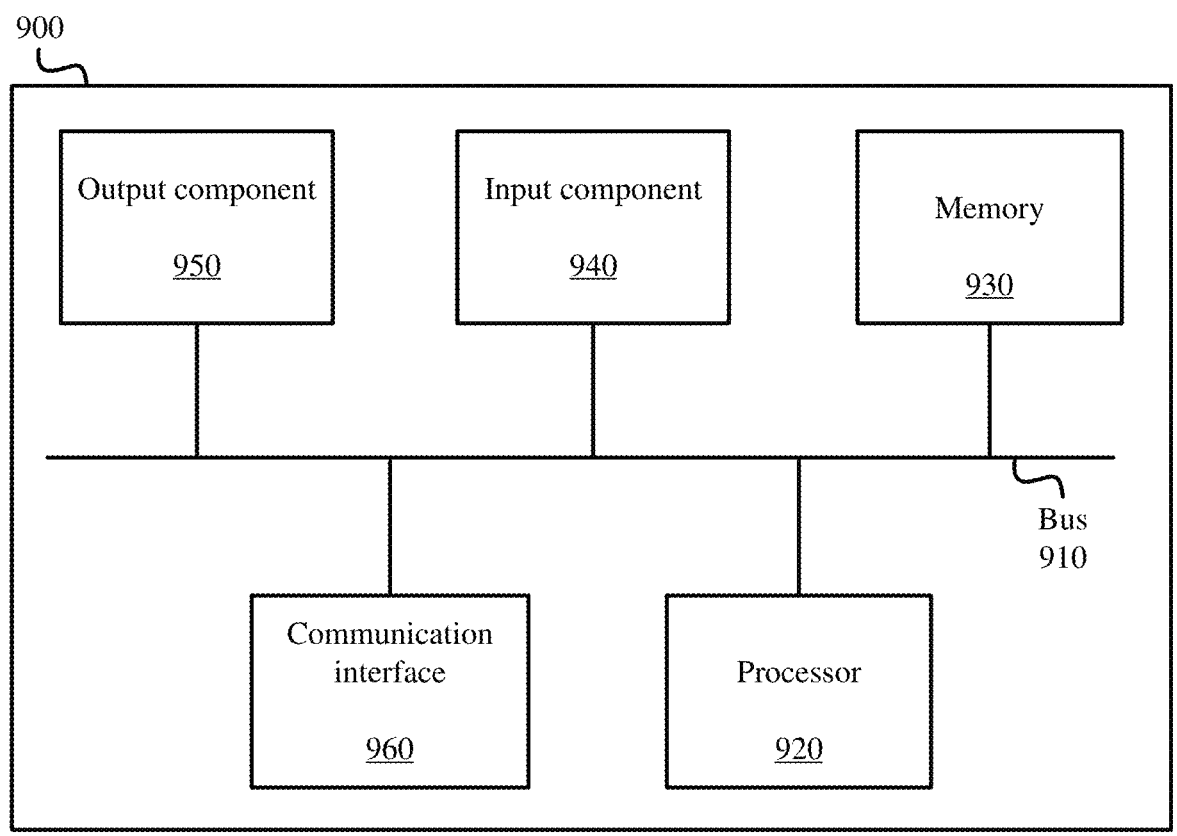
FIG. 9 illustrates example components of one or more devices, according to one or more embodiments described herein.

FIG. 9 is a diagram of example components of device 900. Device 900 may be used to implement one or more of the devices or systems described above (e.g., compute device 120, function manager 125, MEC device 210, image registry 155, repository 150, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to FIGS. 4-8, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. For instance, function manager 125 may execute from a shared device that also performs various services and/or functionalities of compute device 120. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device in a distributed Edge Compute Network ("ECN"), the device comprising:
   a non-transitory computer-readable medium storing a set of processor-executable instructions; and
   one or more processors configured to execute the set of processor-executable instructions, wherein executing the set of processor-executable instructions causes the one or more processors to:
      initialize an executable environment for each of a plurality of functions based on at least one prior request directed to each function of the plurality of functions, wherein each executable environment contains different software used in executing a different function from the plurality of functions on the device, and wherein each function of the plurality of functions is defined by a different user;
      receive a request to execute a particular function;
      perform a function miss in response to determining that an executable environment for the particular function has not been initialized on the device, wherein the processor-executable instructions to perform the function miss comprise processor-executable instructions to:
         forward the request to another device of the ECN; and
      respond to the request in response to determining that the executable environment for the particular function has been initialized, wherein the processor-executable instructions to respond to the request comprise processor-executable instructions to:
         execute the particular function within the executable environment for the particular function.

2. The device of claim 1, wherein the processor-executable instructions further include processor-executable instructions to:
   create a unique address and port combination for each executable environment that is initialized for the plurality of functions; and
   wherein the processor-executable instructions to respond to the request further comprise processor-executable instructions to:
      match an identifier from the request to a particular unique address and port combination that is created to communicate with the executable environment for the particular function; and
      reissue the request to the particular unique address and port combination.

3. The device of claim 1, wherein the processor-executable instructions further include processor-executable instructions to:
   create a unique address and port combination for each executable environment that is initialized for the plurality of functions; and
   wherein the processor-executable instructions to respond to the request further comprise processor-executable instructions to:
      distribute the request according to a routing table that maps a particular unique address and port combination, that is created to communicate with the executable environment for the particular function, to the initialized executable environment for the particular function.

4. The device of claim 1, wherein the processor-executable instructions further include processor-executable instructions to:
   map a first identifier from a Uniform Resource Locator ("URL") of the request to a different second identifier that is created to communicate with the executable environment for the particular function; and
   wherein the processor-executable instructions to respond to the request further comprise processor-executable instructions to:
      call the particular function using the second identifier.

5. The device of claim 1, wherein the processor-executable instructions further include processor-executable instructions to:
   create a different socket for each executable environment that is initialized for the plurality of functions; and
   wherein the processor-executable instructions to respond to the request further comprise processor-executable instructions to:
      retrieve the socket that is created to communicate with the executable environment for the particular function; and
      call the particular function via the socket that is retrieved.

6. The device of claim 5, wherein the processor-executable instructions further include processor-executable instructions to:
extract an identifier from the request; and
determine that the executable environment for the particular function has been initialized on the device in response to locating the socket, that is created to communicate with the executable environment for the particular function, with the identifier.

7. The device of claim 6, wherein the processor-executable instructions further include processor-executable instructions to:
traverse a file system based on the identifier;
identify a directory in the file system as a result of the traversal; and
obtain the socket, that is created to communicate with the executable environment for the particular function, from the directory.

8. The device of claim 1, wherein the processor-executable instructions to perform the cache miss further comprise processor-executable instructions to:
retrieve the executable environment for the particular function from a repository; and
initialize the executable environment for the particular function on the device.

9. The device of claim 1, wherein the processor-executable instructions further include processor-executable instructions to:
track a number of times the particular function is requested; and
wherein the processor-executable instructions to perform the cache miss further comprise processor-executable instructions to:
initialize the executable environment for the particular function on the device in response to the number of times the particular function is requested satisfying a threshold.

10. The device of claim 1, wherein the particular function comprises code for a set of user-defined operations, and wherein the executable environment for the particular function comprises the set of user-defined operations in a container or image that can be executed from an operating system of the device.

11. The device of claim 1, wherein the processor-executable instructions further include processor-executable instructions to:
receive a set of user-defined operations that provide the code for the particular function;
determine a programming language used to define the set of user-defined operations;
select an executable environment template from a plurality of executable environment templates based on the programming language; and
build the executable environment for the particular function by configuring software from the executable environment template to execute the set of user-defined operations.

12. The device of claim 1, wherein the processor-executable instructions to respond to the request further comprise processor-executable instructions to:
obtain a configuration file associated with the executable environment for the particular function, the configuration file defines a set of compute resources from the device to allocate during execution of the particular function; and
wherein the processor-executable instructions to execute the particular function comprise processor-executable instructions to:
restrict usage of compute resources during execution of the particular function based on the configuration file.

13. The device of claim 1, wherein the processor-executable instructions further include processor-executable instructions to:
monitor usage of each executable environment that is that is initialized for the plurality of functions and the executable environment for the particular function;
monitor resource utilization of the device;
select at least a first executable environment for one of the plurality of functions and the executable environment for the particular function based on usage of the first executable environment and the resource utilization of the device satisfying a threshold; and
remove the first executable environment from the device.

14. The device of claim 1, wherein the processor-executable instructions to respond to the request further comprise processor-executable instructions to:
provide one or more results from executing the particular function to a user submitting the request.

15. A non-transitory computer-readable medium, storing a set of processor-executable instructions, which, when executed by one or more processors, cause the one or more processors to:
initialize an executable environment for each of a plurality of functions based on at least one prior request directed to each function of the plurality of functions, wherein each executable environment contains different software used in executing a different function from the plurality of functions on the device, and wherein each function of the plurality of functions is defined by a different user;
receive a request to execute a particular function;
perform a function miss in response to determining that an executable environment for the particular function has not been initialized on the device, wherein the processor-executable instructions to perform the function miss comprise processor-executable instructions to:
forward the request to another device of the ECN; and
respond to the request in response to determining that the executable environment for the particular function has been initialized, wherein the processor-executable instructions to respond to the request comprise processor-executable instructions to:
execute the particular function within the executable environment for the particular function.

16. The non-transitory computer-readable medium of claim 15, wherein the processor-executable instructions further include processor-executable instructions to:
map a first identifier from a Uniform Resource Locator ("URL") of the request to a different second identifier that is created to communicate with the executable environment for the particular function; and
wherein the processor-executable instructions to respond to the request further comprise processor-executable instructions to:
call the particular function using the second identifier.

17. A method comprising:
initializing an executable environment for each of a plurality of functions based on at least one prior request directed to each function of the plurality of functions, wherein each executable environment contains different software used in executing a different function from the plurality of functions on the device, and wherein each function of the plurality of functions is defined by a different user;

receiving a request to execute a particular function;

performing a function miss in response to determining that an executable environment for the particular function has not been initialized on the device, wherein performing the function miss comprises:

forwarding the request to another device of the ECN; and responding to the request in response to determining that the executable environment for the particular function has been initialized, wherein responding to the request comprises:

executing the particular function within the executable environment for the particular function.

18. The method of claim 17 further comprising:

receiving a set of user-defined operations that provide the code for the particular function;

determining a programming language used to define the set of user-defined operations;

selecting an executable environment template from a plurality of executable environment templates based on the programming language; and building the executable environment for the particular function by configuring software from the executable environment template to execute the set of user-defined operations.

19. The method of claim 17 further comprising:

obtaining a configuration file associated with the executable environment for the particular function, the configuration file defines a set of compute resources from the device to allocate during execution of the particular function; and wherein executing the particular function comprises:

restricting usage of compute resources during execution of the particular function based on the configuration file.

20. The method of claim 17 further comprising:

monitoring usage of each executable environment that is initialized for the plurality of functions and the executable environment for the particular function;

monitoring resource utilization of the device;

selecting at least a first executable environment for one of the plurality of functions and the executable environment for the particular function based on usage of the first executable environment and the resource utilization of the device satisfying a threshold; and removing the first executable environment from the device.

* * * * *